US008626484B1

United States Patent
Zhao et al.

(10) Patent No.: US 8,626,484 B1
(45) Date of Patent: Jan. 7, 2014

(54) LIGHT-WEIGHT AND FLEXIBLE FEATURE SIMULATOR

(75) Inventors: Yue Zhao, Shanghai (CN); Yuanjie Wu, Shanghai (CN); Peiyu Zhuang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 427 days.

(21) Appl. No.: 12/968,854

(22) Filed: Dec. 15, 2010

(51) Int. Cl.
*G06F 9/45* (2006.01)
(52) U.S. Cl.
USPC ............................. 703/22; 703/13; 717/124
(58) Field of Classification Search
USPC .......................................................... 703/22
See application file for complete search history.

(56) References Cited

U.S. PATENT DOCUMENTS 5,421,004 A * 5/1995 Carpenter et al. ............... 714/25
6,092,071 A * 7/2000 Bolan et al. ......................... 1/1
6,879,266 B1 * 4/2005 Dye et al. ........................ 341/51
7,478,026 B1 * 1/2009 Kushner et al. ................. 703/13
8,117,361 B2 * 2/2012 De Peuter et al. .............. 710/68

OTHER PUBLICATIONS

Griffin et al, "Timing-Accurate Storage Emulation", Proceedings of the Conference on File and Storage Technologies (FAST), Jan. 2002.*
Smith et al, "IZO: Applications of Large-Window Compression to Virtual Machine Management", 22nd Large Installation System Administration Conference, 2008.*
Wu, et al., "Compression System Pause and Auto-Resume", U.S. Appl. No. 12/819,767, filed Jun. 21, 2010.

* cited by examiner

*Primary Examiner* — Mary C Jacob
(74) *Attorney, Agent, or Firm* — BainwoodHuang

(57) ABSTRACT

A method is provided for testing a feature provider module of a data storage management application (DSMA), the feature provider module providing a feature. The method includes (a) receiving, at a simulation module of the DSMA when the DSMA is not in communication with an external feature implementation component, a test feature command from the feature provider module, (b) at the simulation module, simulating behavior of an interface module in communication with the external feature implementation component, and (c) at the simulation module, returning a feature response to the feature provider module, the feature response communicating the simulated behavior.

16 Claims, 5 Drawing Sheets

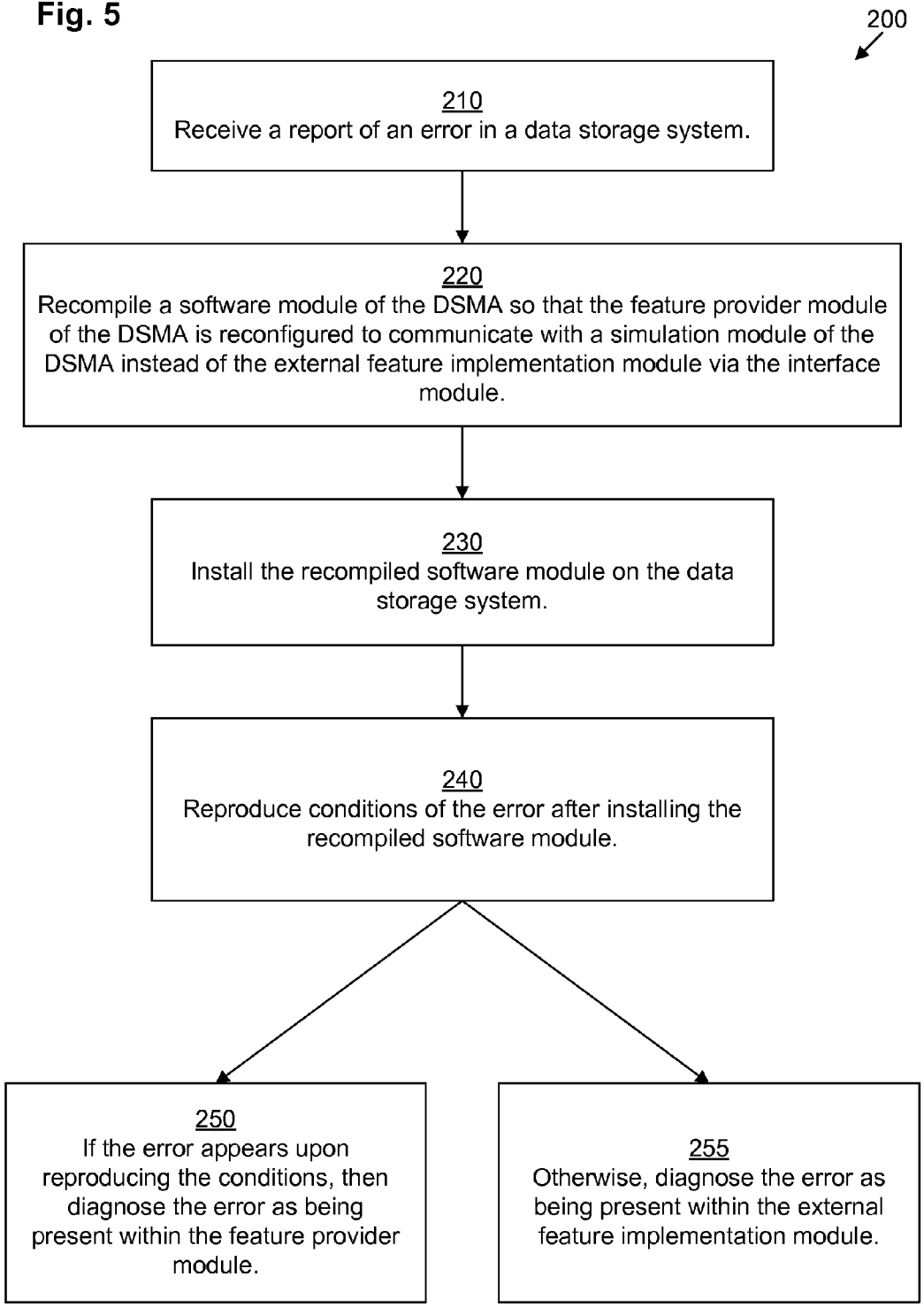

LIGHT-WEIGHT AND FLEXIBLE FEATURE SIMULATOR

BACKGROUND

Large amounts of data are often stored on massive data storage systems. These data storage systems typically contain a host computer connected to a plurality of storage devices. The host computer runs a data storage management application to control and manage the data storage system.

In some data storage management applications, various data storage features (e.g., data migration services) may be implemented externally to the data storage management application by various external feature implementation components (e.g., feature drivers, hardware-implemented feature devices). Thus, the data storage management application may include one or more feature provider modules, which each facilitate communication between a user and an external feature implementation component for implementing that feature.

SUMMARY

In some circumstances, it may be undesirable to require that a feature provider module actually communicate with an external feature implementation component for implementing the feature. For example, if a developer is in the process of developing the feature provider module, while the external feature implementation component for that feature is not yet ready or accessible, it may be impossible or undesirable for the feature provider module to attempt to communicate with a nonexistent or incomplete external feature implementation component, yet the developer may still want to test the performance of the feature provider module. As an additional example, in a completed data storage management application, if an error occurs, but it is not clear whether the error occurred in the feature provider module or in the external feature implementation component, it may be desirable to isolate the components.

Thus, various embodiments are provided to allow the developer to connect the feature provider module with a simulation module instead of with the external feature implementation component. The simulation module serves to simulate the actions and responses of the external feature implementation component without actually implementing the feature. This is beneficial because a simulation module can be built without exerting too much effort, yet it allows the feature provider module to be tested during development. It also allows the feature provider module and the external feature implementation component to be isolated for diagnostic purposes.

In one embodiment, a method is provided for testing a feature provider module of a data storage management application (DSMA), the feature provider module providing a feature. The method includes (a) receiving, at a simulation module of the DSMA when the DSMA is not in communication with an external feature implementation component, a test feature command from the feature provider module, (b) at the simulation module, simulating behavior of an interface module in communication with the external feature implementation component, and (c) at the simulation module, returning a feature response to the feature provider module, the feature response communicating the simulated behavior. A corresponding apparatus is also provided.

In another embodiment, a method is provided for diagnosing an error in a data storage system, the data storage system being managed by a DSMA having a feature provider module configured to communicate with an external feature implementation component via an interface module of the DSMA. The method includes (a) receiving a report of the error, (b) recompiling a software module of the DSMA so that the feature provider module of the DSMA is reconfigured to communicate with a simulation module of the DSMA instead of the external feature implementation component via the interface module, (c) installing the recompiled software module on the data storage system, (d) reproducing conditions of the error after installing the recompiled software module, and (e) if the error appears upon reproducing the conditions, then diagnosing the error as being present within the feature provider module—otherwise, (f) diagnosing the error as being present within the external feature implementation component.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 5 depicts an example method for diagnosing an error in a data storage system according to one embodiment of the invention.

DETAILED DESCRIPTION

Various embodiments are provided to allow a developer of a data storage management application to connect a feature provider module with a simulation module instead of with an external feature implementation component. The simulation module serves to simulate the actions and responses of the external feature implementation component without actually implementing the feature. This is beneficial because a simulation module can be built without exerting too much effort, yet it allows the feature provider module to be tested during development. It also allows the feature provider module and the external feature implementation component to be isolated for diagnostic purposes.

Figure 1:
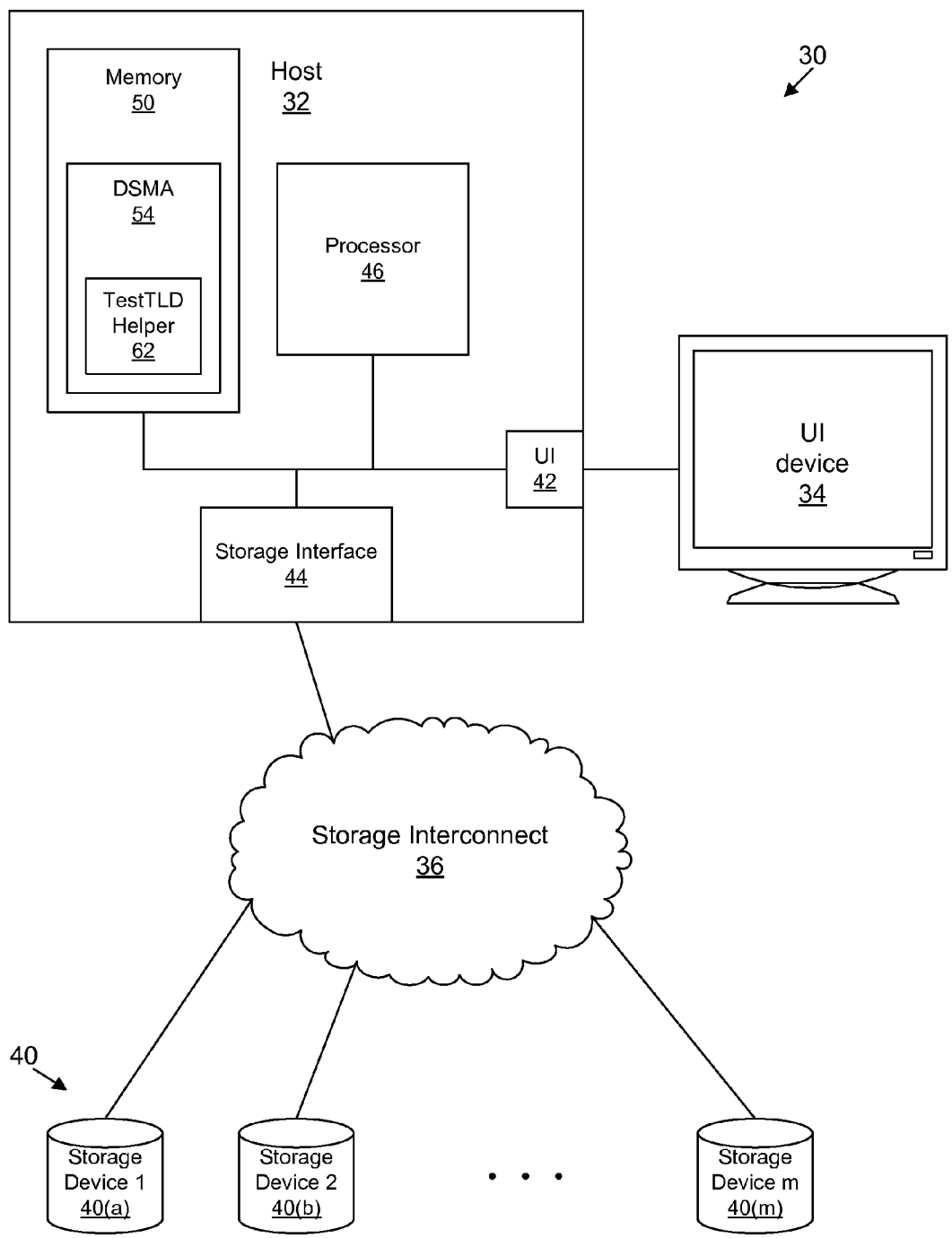
FIG. 1 depicts an example system for use in practicing various embodiments of the invention.

FIG. 1 depicts an example computer system 30 for use in performing various embodiments of the invention. System 30 (e.g., a data storage system) includes a host 32, a user interface (UI) device 34, a storage interconnect 36, and a set of storage devices 40 (depicted as storage devices 40(a), 40(b), . . . , 40(m)). Host 32 connects to UI device 34 and to storage interconnect 36. Storage interconnect 36 connects to the set of storage devices 40.

The storage interconnect 36 can be any type of network or bus capable of interconnecting storage devices 40 with host 32. In some embodiments, the storage devices 40 and host 32 are interconnected in a manner such that, to the operating systems running on the host 32, the storage devices 40 appear as locally attached, but this is not required for the invention. The storage interconnect 36 may be a shared, public, or private network and encompasses a wide area or local area and can be implemented through any suitable combination of wired and/or wireless communication networks. Furthermore, the storage interconnect 36 may include a LAN, a WAN, an intranet, the Internet, or a set of switches. For example, in one embodiment, the storage interconnect 36 works with Fibre Channel connectivity and is implemented in the form of a storage area network (SAN). In another embodiment, the storage interconnect 36 works with internet protocol (IP) connectivity and is implemented via an Internet-Small Computer System Interface (iSCSI) (e.g., for Fibre Channel). Those of skill in the art will recognize that other implementations are, of course, possible.

Storage devices 40 may be any sort of storage equipment capable of connecting to storage interconnect 36. In some embodiments, each storage device 40 is a disk array. As is well-known in the art, a typical disk array includes a disk array controller, disk enclosures holding a plurality of disk drives, and a power supply. A disk array may also include a cache. Examples of disk arrays include the Symmetrix Integrated Cache Disk Array System and the CLARiiON Disk Array System, both available from EMC Corp. of Hopkinton, Mass.

Host 32 includes a UI 42 for connecting to UI device 34. It should be understood that UI device 34 may include one or more devices for interfacing with a user. UI device 34 may include one or more of a display monitor, a printer, a touch screen, a keyboard, a mouse, a trackpad, a trackball, or any other known device for interfacing with a user. Host 32 also includes a storage interface 44 for connecting to storage interconnect 36. Storage interface 44 may include, for example, a network adapter or an iSCSI adapter. Host 32 also includes a processor 46 and memory 50.

Processor 46 may be any sort of controller, such as, for example, a general purpose processor or microprocessor, a central processing unit, a set of multiple processing units, or a set of dedicated circuitry designed to perform particular operations in hardware. Memory 50 may be made up of one or more of the following: volatile random access memory, non-volatile read-only memory, non-volatile flash memory, magnetic storage, optical storage, etc. Among other components, memory 50 stores a data storage management application (DSMA) 54 which includes a simulation module, such as TestTLD Helper 62 (described in detail below).

Figure 2:
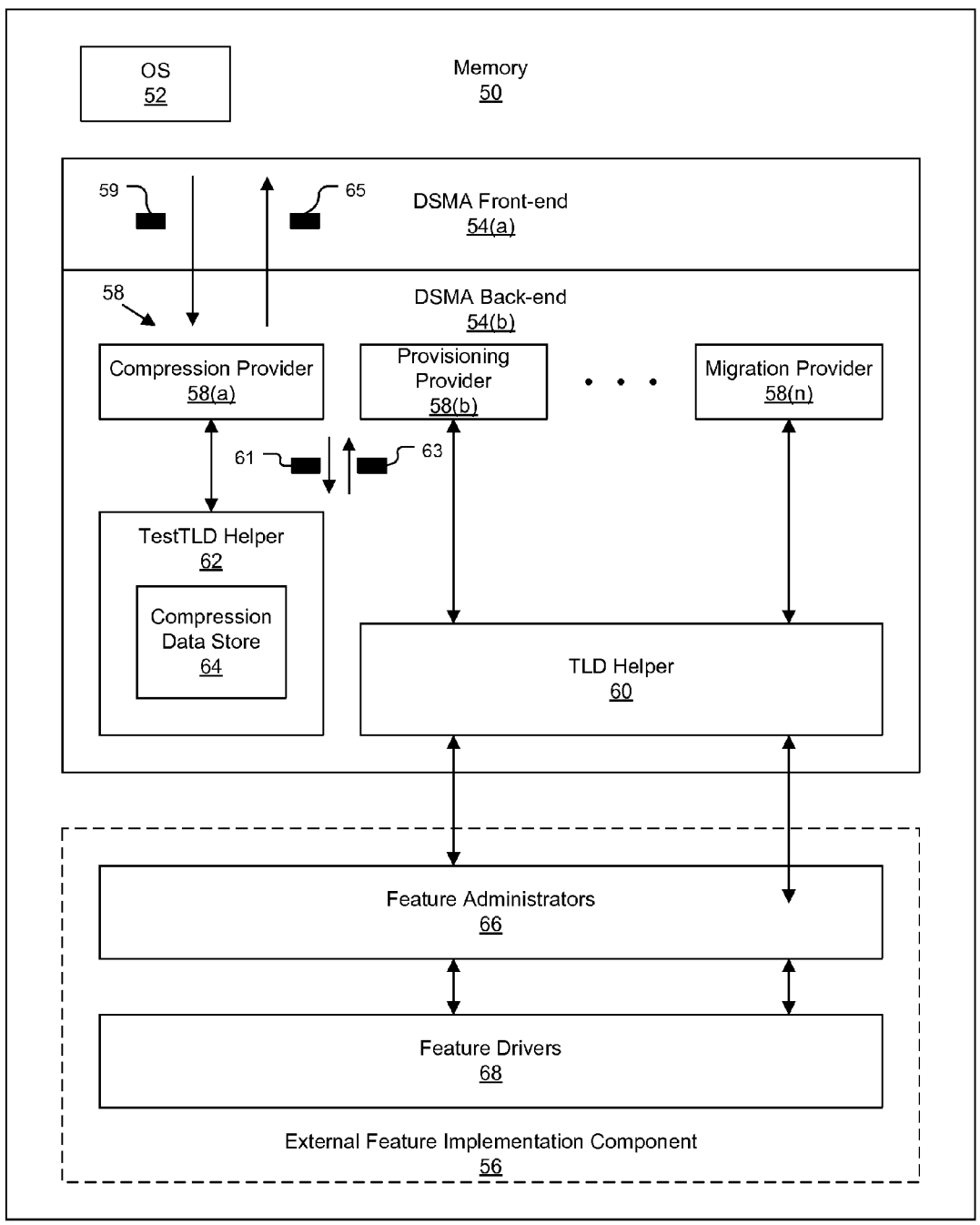
FIG. 2 depicts an example memory and contents for use in practicing various embodiments of the invention.

FIG. 2 illustrates certain software that is contained within the memory 50 during system operation (although it may also contain some or all of these elements while the system is not in operation as well). As shown, in one embodiment, memory 50 stores an operating system (OS) 52, a DSMA 54, and, in some embodiments, an external feature implementation component 56. Memory 50 may also store additional computer program applications and application data (not shown). OS 52, DSMA 54, and external feature implementation component 56 each contain a set of instructions to be executed by processor 54.

One example of a DSMA 54 usable in some embodiments is the Navisphere program produced by EMC Corp. of Hopkinton, Mass. It should be understood that this is by way of example only; other products may also serve as the DSMA 54.

As depicted, DSMA 54 includes a front-end component 54(*a*) for interfacing with a user and a back-end component 54(*b*) for implementing management of the data storage system 30. The front-end of DSMA 54(*a*) implements a graphical user interface for DSMA 54 and converts user input commands 59 into commands 61 to be processed by the back-end of DSMA 54(*b*). The front-end of DSMA 54(*a*) also displays data generated by the back-end of DSMA 54(*b*) to the user on UI device 34.

The back-end of DSMA 54(*b*) includes a set of feature provider modules 58 (depicted as feature provider modules 58(*a*), 58(*b*), . . . , 58(*n*)). Feature provider modules 58 are software modules that are capable of providing various management features of the data storage system 30 to the DSMA 54. As depicted, the set of feature provider modules 58 includes a compression provider module 58(*a*), a provisioning provider module 58(*b*), and a migration provider module 58(*n*).

Some of the feature provider modules 58 (e.g., provisioning provider module 58(*b*) and migration provider module 58(*n*)) communicate with an interface module, such as Tagged Length Data (TLD) Helper module 60. These feature provider modules 58 send feature commands 61 to external feature implementation component 56 via TLD Helper 60. TLD helper 60 converts the feature commands 61 into a TLD data structure, which is a data structure for exchanging data between DSMA 54 and external feature implementation component 56. TLD Helper 60 also sends feature response commands 63 back to the appropriate feature provider module 58 upon receiving TLD response data from the external feature implementation component 56. The appropriate feature provider module 58 is then able to display updates to the user regarding a status update of the command by sending a response signal 65 to the front-end 54(*a*), which communicates with UI 42.

The external feature implementation component 56 implements the various features of the data storage system 30. It should be understood that, in some embodiments, external feature implementation component 56 is a software module (or a set of software modules) executing on host 32. In these embodiments, the external feature implementation component 56 is external to the DSMA 54. In other embodiments, external feature implementation component 56 is a hardware or software module within a storage device 40. In yet other embodiments, external feature implementation component 56 is partially implemented on host 32 and partially implemented on a storage device 40.

In some embodiments, external feature implementation component 56 contains two subcomponents: a feature administrator portion 66 and a feature driver portion 68. Feature administrator portion 66 may contain one or more feature administrator modules, and feature driver portion 68 may contain one or more feature driver modules.

Feature administrator 66 collects TLD commands from TLD Helper 60 and translates and passes them on to the appropriate respective feature drivers 68. Each feature driver 68 either implements the appropriate feature itself or interfaces with hardware that implements the feature.

During a development phase, developers of the DSMA 54 may wish to add support for a new feature to DSMA 54 (e.g., by adding a new feature provider module 58, such as compression provider module 58(*a*)). The corresponding feature driver 68 may be developed in parallel by a separate driver development team. Thus, when the DSMA 54 developers wish to test their implementation of compression feature module 58(*a*), if the compression driver 68 is not yet ready, they may (temporarily) implement compression feature module 58(*a*) to communicate with a simulation module, such as TestTLD Helper module 62 instead of with TLD Helper module 60.

TestTLD Helper module 62 is a special component of the DSMA back-end 54(*b*) that simulates the combined behavior of TLD Helper module 60 and external feature implementation component 56. In some embodiments, TestTLD Helper module 62 includes simulation data, such as, for example, Compression Data Store 64, which may be implemented as a database in, for example, eXtensible Markup Language (XML) format. Further detail with respect to the TestTLD Helper module 62 is provided in connection with FIGS. 3 and 4.

Figure 3:
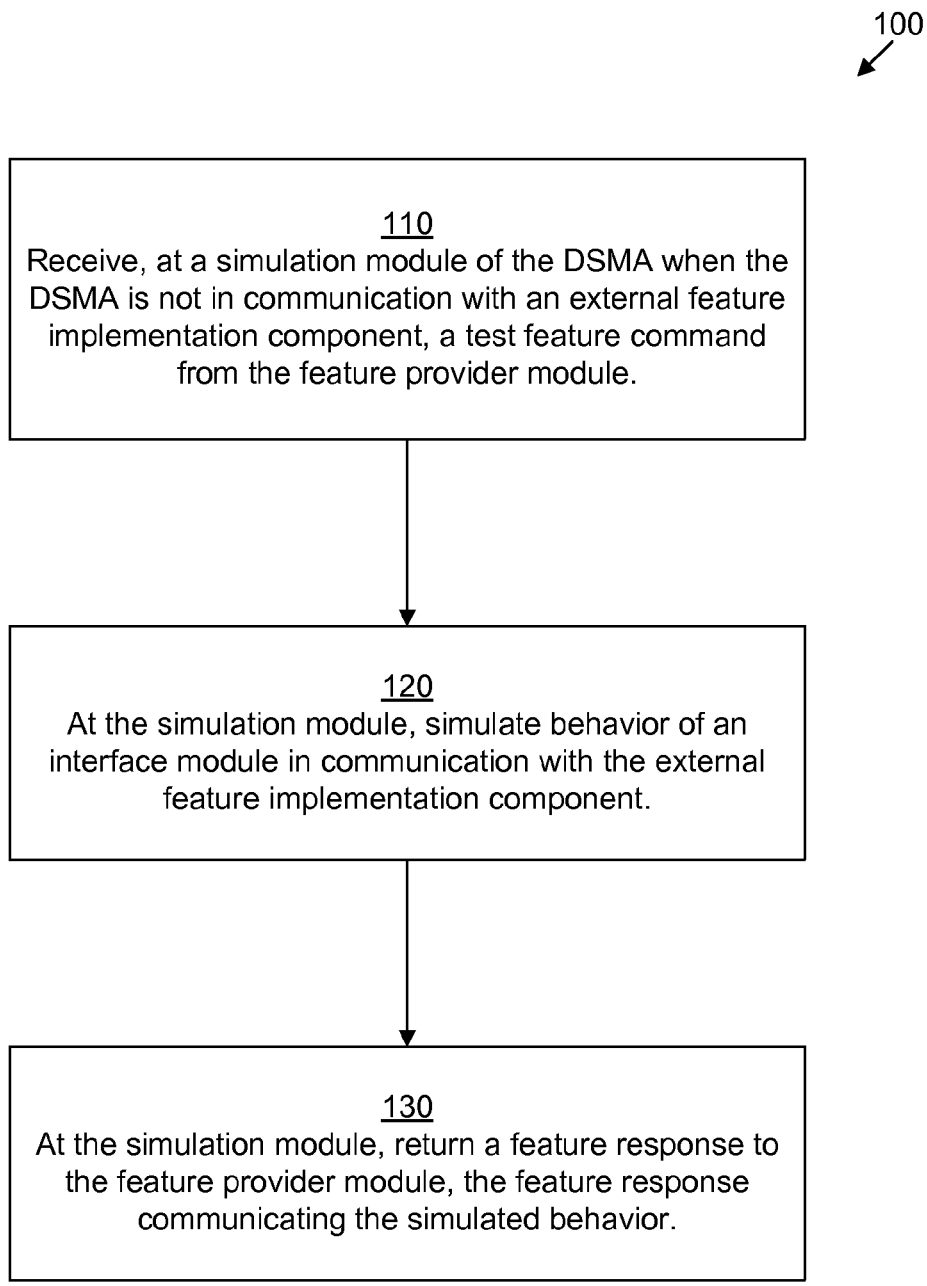
FIG. 3 depicts an example method for testing a feature provider module of a data storage management application according to one embodiment of the invention.

FIG. 3 depicts an example method for testing a feature provider module 58 of a data storage management application according to one embodiment of the invention. In step 110, simulation module (e.g., TestTLD Helper module 62) receives a test feature command 61 from a feature provider module 58 (e.g., compression feature module 58(a)). This may be done, for example, when DSMA 54 is not in contact with the external feature implementation component 56 for the feature (e.g., compression) in question. The format of the test feature command 61 may be the same as the format of a command as it would be sent to TLD Helper 60.

In step 120, simulation module (e.g., TestTLD Helper module 62) simulates the behavior of an interface module (e.g., TLD Helper 60) in communication with the external feature implementation component 56. Further details of this step are provided below.

In step 130, simulation module (e.g., TestTLD Helper module 62) returns a feature response 63 to the feature provider module 58, the feature response 63 communicating the simulated behavior.

For example, if the feature is compression, then a user may indicate through front-end 54(a) (via user command 59) that he wishes to compress a logical volume LV1 of the storage system 30. Compression provider module 58(a) would then issue a "compression-on" command for LV1 by sending the command 61 to TestTLD Helper 62. TestTLD Helper 62 then simulates the behavior of TLD Helper 60, as described below, and sends back appropriate responses 63.

For example, in a more conventional system (or, if the feature is not being tested or diagnosed), if the command 61 had gone to TLD Helper 60, then TLD Helper 60 would have converted the command 61 to a TLD command and sent it to feature administrator 60, which, in turn, would have translated and passed on that TLD command to compression feature provider 68. Compression feature driver 68 would then go about compressing LV1. At various points during this process, if compression provider module 58(a) were to poll compression feature driver 68 by sending a status update command 61 via TLD Helper 60, compression feature driver 68 would respond by sending back a feature response indicating what the status of the compression was (e.g., an error; an indication of what portion of the drive had been compressed; etc.).

Instead, in the technique depicted in FIG. 3, when the "compression-on" command 61 for LV1 is directed at Test-TLD Helper 62, TestTLD Helper 62 mimics compression of LV1 by maintaining a state machine and sending back appropriate feature responses 63 when polled. This is beneficial because it allows the operation of compression provider 58(a) to be tested even though a corresponding feature driver 68 for the compression feature is not yet available to the developers of compression provider 58(a).

Figure 4:
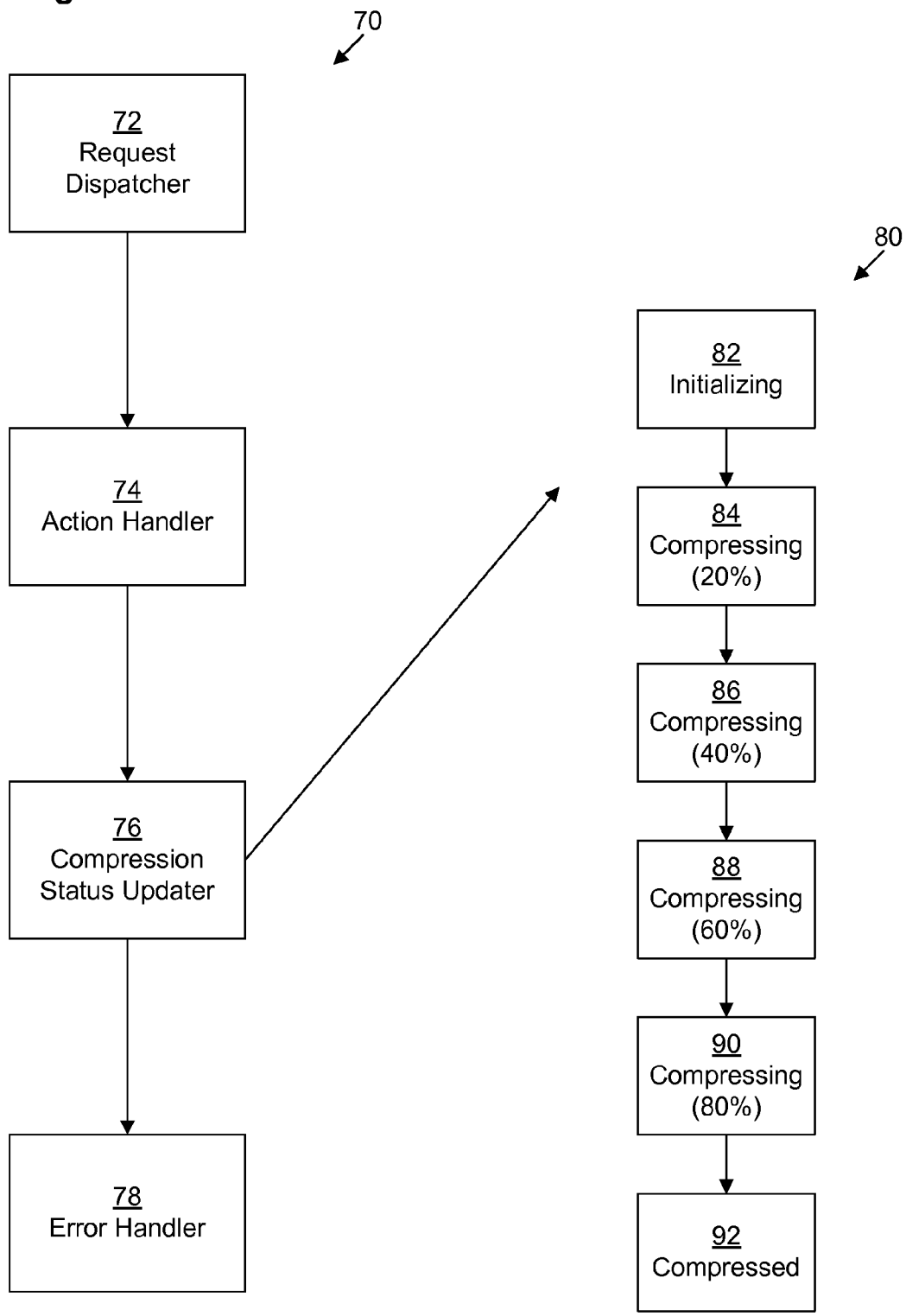
FIG. 4 depicts an example workflow structure of an application component according to one embodiment of the invention.

FIG. 4 illustrates the structure and operation of an example TestTLD Helper 62 for use with a compression feature in further detail with reference to a workflow 70 and state machine 80. Request dispatcher component 72 of TestTLD Helper 62 receives the compression command 61, parses it, and dispatches the command to a particular action handler 74 associated with a particular type of TLD command. For example, a "compression-on" command may be handled by a "create" action handler 74 (associated with a "create" TLD command), a "compression-off" command may be handled by a "delete" action handler 74, a "compression-modify" command may be handled by a "set" action handler 74, and a "compression-list" command may be handled by a "get" action handler 74.

For example, "create" action handler 74 would create a new compression object associated with a particular logical volume (e.g. LV1) within compression data store 64 using any parameters from the command, while "set" action handler 74 would load the appropriate compression object associated with LV1 from compression data store 64 and change the compression parameters. "Get" action handler 74 would load the appropriate compression object associated with LV1 from compression data store 64 and return the parameters and status. Any of the action handlers 74 might throw an error. For example, if a "compression-on" command were to be received for a logical volume that had already been compressed (e.g., a compression object already existed within compression data store 64), an error might be thrown.

After the action of action handler 74, workflow 70 passes on to compression status updater 76. Compression status updater 76 maintains, within compression data store 64, a state machine 80 associated with each compression object, and automatically transitions every state machine 80 to a next state every time a command 61 is issued to TestTLD Helper 62. State machine 80 may take various forms, however, as depicted in FIG. 4, state machine 80 has an initial "initializing" state 82, after which it transitions through various "compressing" states 84-90 (i.e., indicating various stages of completion of the compression, e.g., 20%, 40%, 60%, and 80% complete) after which it transitions to a "compressed" state 92. Upon reaching the "compressed" state 92, the state machine 80 for that compression object may cease to transition. It should be understood that although state machine 80 is depicted as having six states, it may have more states or fewer states. It should also be understood that although compression status updater 76 has been described as updating the state of each state machine 80 every time a command 61 is issued to TestTLD Helper 62, in an alternate embodiment, compression status updater 76 might instead update the state of each state machine 80 at fixed time intervals or upon some other indication.

In addition to storing each compression object and the state associated with each, compression data store 64 may also store configuration data for TestTLD Helper 62, such as, for example, the configuration of state machines 80 for various commands.

After the action of compression status updater 76, workflow 70 passes on to error handler 78. Error handler 78 is responsible for processing error and success codes thrown by any of the workflow components 72-76. Thus, if any of the workflow components 72-76 throws an error, error handler 78 sends an error signal (e.g., in a feature response command 63) back to compression provider 58(a). Alternatively, after a successful command, error handler 78 sends a status update (e.g., in a feature response command 63) indicating the status of the compression object at issue back to compression provider 58(a). For example, if, after receiving a "compression-on" command 61 for LV1, TestTLD Helper 62 receives a "compression-list" command 61 for LV1 while the state of the state machine 80 for LV1 is in state 88, error handler 78 would send back a compression response 63 to compression provider 58(a) indicating that LV1 is 60% compressed. That compression response 63, which may be forwarded to front-end 54(*a*) as a response signal 65, allows front end 54(*a*) to indicate to the user via UI 42 that LV1 is 60% compressed.

Operation of method 100 therefore allows a DSMA 54 developer to test the operation of compression feature provider 58(*a*) even when compression feature driver 68 is not yet operational or installed on host 32.

FIG. 5 depicts an example method 200 for diagnosing an error in a data storage system according to another embodiment of the invention. Method 200, which instead of being performed while developing a feature provider module 58, is performed at a later time to diagnose an error in data storage system 30.

In step 210, host 32 receives a report of an error in data storage system 30. In some embodiments, host 32 transmits this error report to a system administrator.

In step 220, a user (such as, for example, the system administrator) recompiles a software module of the DSMA 54 so that a feature provider module 58 of the DSMA 54 is reconfigured to communicate with a simulation module (e.g., TestTLD Helper module 62) of the DSMA 54 instead of the external feature implementation component 56 via the interface module. In one embodiment, this is done by changing a build constant within a build module so that the linker links the code such that one feature provider module 58(*a*) communicates with TestTLD Helper module 62 instead of TLD Helper module 60. For example, the following code may be included within the source code for compression provider module 58(*a*):

ifdef COMPRESSION_UNIT_TEST
include "Test/MyTLDHelper.h"
typedef_CompressionTestTLDHelper MyTLDHelper;
else
Typedef TLDHelper MyTLDHelper;
endif Thus, even though all modules of DSMA 54 have already been compiled into object code modules, if the user modifies the build file to define the constant COMPRESSION_UNIT_TEST, then upon rebuilding the DSMA 54, the linker will re-link the object code modules such that all references to MyTLDHelper in compression provider module 58(*a*) link to CompressionTestTLDHelper instead of TLDHelper. Typically, the functions within MyTLDHelper.h, such as the TestTLD Helper module 62 and intermediate functions called by compression provider module 58(*a*), will be found in object form within a dynamic link library (DLL) already present within host 32.

It should be understood that the term "recompiling" may refer to any step within the compilation and build processes. Thus, in one embodiment, it may include actually compiling one or more software modules, while in another embodiment, no actual compilation is performed, but only link-level processing is performed.

In some embodiments, instead of the user performing step 220, an error-diagnosing application running on host 32 performs this step by automatically modifying the build file and re-building the DSMA 54.

In step 230, the user (or the error diagnosing application) installs the recompiled software module on the data storage system. In some embodiments, this step may be performed automatically by rebuilding or recompiling the DSMA 74 directly within the installation directory.

In step 240, the user (or the error diagnosing application) reproduces conditions of the error after installing the recompiled software module. If the error appears again upon reproducing the error conditions, then the error may be diagnosed (either by the user or by the error diagnosing application) as being present within the feature provider module 58(*a*) (step 250). If the error does not appear upon reproducing the error conditions, then the error may be diagnosed (either by the user or by the error diagnosing application) as being present within the external feature implementation component 56 (step 255).

Thus, by performing method 200, a user is able to diagnose what component of data storage system 30 is causing an error.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of testing a feature provider module of a data storage management application (DSMA), the feature provider module providing a feature, the method comprising:
   receiving, at a simulation module of the DSMA when the DSMA is not in communication with an external feature implementation component, a test feature command from the feature provider module;
   at the simulation module, simulating behavior of an interface module in communication with the external feature implementation component; and
   at the simulation module, returning a feature response to the feature provider module, the feature response communicating the simulated behavior;
   wherein the feature provider module is a compression feature provider module configured to:
   receive a compression command from a user;
   pass the compression command to the external feature implementation component via the interface module; and
   display updates to the user regarding a status of the compression command.

2. The method of claim 1, wherein simulating includes simulating an external feature driver for implementing the feature.

3. The method of claim 2, wherein simulating further comprises simulating an external intermediate module, the intermediate module configured to translate and pass commands between the interface module and the feature driver.

4. The method of claim 1, wherein receiving the test feature command includes receiving a command to compress a particular logical unit of a data storage system managed by the DSMA.

5. The method of claim 4, wherein simulating includes returning an error signal to the feature provider module if the particular logical unit has previously been compressed.

6. The method of claim 4, wherein simulating includes transitioning between states of a state machine that represent stages of a compression process.

7. The method of claim 6 wherein transitioning is performed in response to receiving a polling command.

8. The method of claim 6 wherein transitioning is performed in response to expiration of a fixed time interval.

9. An apparatus comprising:
   memory, the memory storing a data storage management application (DSMA), the DSMA including:
      a feature provider module, the feature provider module providing a feature; and
      a simulation module; and
   a controller, the controller configured to test the feature provider module by:
      receiving, at the simulation module when the DSMA is not in communication with an external feature implementation component, a test feature command from the feature provider module;
      at the simulation module, simulating behavior of an interface module in communication with the external feature implementation component; and
      at the simulation module, returning a feature response to the feature provider module, the feature response communicating the simulated behavior;
   wherein the feature provider module is a compression feature provider module, which when executed by the controller, causes the controller to:
      receive a compression command from a user;
      pass the compression command to the external feature implementation component via the interface module; and
      display updates to the user regarding a status of the compression command.

10. The apparatus of claim 9, wherein the controller, when simulating the behavior of the interface module in communication with the external feature implementation component, is configured to simulate an external feature driver for implementing the feature.

11. The apparatus of claim 10, wherein the controller, when simulating the behavior of the interface module in communication with the external feature implementation component, is further configured to simulate an external intermediate module, the intermediate module configured to translate and pass commands between the interface module and the feature driver.

12. The apparatus of claim 9, wherein the controller, when receiving the test feature command, is configured to receive a command to compress a particular logical unit of a data storage system managed by the DSMA.

13. The apparatus of claim 12, wherein the controller, when simulating the behavior of the interface module in communication with the external feature implementation component, is configured to return an error signal to the feature provider module if the particular logical unit has previously been compressed.

14. The apparatus of claim 12, wherein the controller, when simulating the behavior of the interface module in communication with the external feature implementation component, is configured to transition between states of a state machine that represent stages of a compression process.

15. The apparatus of claim 14 wherein the controller, when simulating the behavior of the interface module in communication with the external feature implementation component, is configured to transition in response to receiving a polling command.

16. The apparatus of claim 14 wherein the controller, when simulating the behavior of the interface module in communication with the external feature implementation component, is configured to transition in response to expiration of a fixed time interval.

* * * * *